US012204755B2

(12) United States Patent
Chilton et al.

(10) Patent No.: US 12,204,755 B2
(45) Date of Patent: Jan. 21, 2025

(54) ELASTIC REQUEST HANDLING TECHNIQUE FOR OPTIMIZING WORKLOAD PERFORMANCE

(71) Applicant: Nutanix, Inc., San Jose, CA (US)

(72) Inventors: Daniel Chilton, Raleigh, NC (US); Gaurav Gangalwar, Pune (IN); Manoj Premanand Naik, San Jose, CA (US); Pradeep Thomas, Santa Clara, CA (US); Will Strickland, Wake Forest, NC (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/853,123

(22) Filed: Jun. 29, 2022

(65) Prior Publication Data
US 2023/0359359 A1    Nov. 9, 2023

(30) Foreign Application Priority Data
May 4, 2022    (IN) .............................. 202241025987

(51) Int. Cl.
    G06F 3/06    (2006.01)
(52) U.S. Cl.
    CPC .......... *G06F 3/0611* (2013.01); *G06F 3/0655* (2013.01); *G06F 3/0679* (2013.01)
(58) Field of Classification Search
    CPC ..... G06F 3/0611; G06F 3/0655; G06F 3/0679
    See application file for complete search history.

(56) References Cited

U.S. PATENT DOCUMENTS

| 8,381,216 | B2* | 2/2013 | Gowda ................. | G06F 9/5027 712/30 |
|---|---|---|---|---|
| 8,549,518 | B1 | 10/2013 | Aron et al. | |
| 8,601,473 | B1 | 12/2013 | Aron et al. | |
| 8,850,130 | B1 | 9/2014 | Aron et al. | |
| 8,863,124 | B1 | 10/2014 | Aron et al. | |
| 9,009,106 | B1 | 4/2015 | Aron et al. | |

(Continued)

OTHER PUBLICATIONS

Cano, Ignacio, "Curator: Self-Managing Storage for Enterprise Clusters" University of Washington; published Mar. 2017; pp. all.

(Continued)

*Primary Examiner* — Edward J Dudek, Jr.
(74) *Attorney, Agent, or Firm* — Cesari and McKenna, LLP

(57) ABSTRACT

An elastic request handling technique limits a number of threads used to service input/output (I/O) requests of a low-latency I/O workload received by a file system server executing on a cluster having a plurality of nodes deployed in a virtualization environment. The limited number of threads (server threads) is constantly maintained as "active" and running on virtual central processing units (vCPUs) of a node. The file system server spawns and organizes the active server threads as one or more pools of threads. The server prioritizes the low-latency I/O requests by loading them onto the active threads and allowing the requests to run on those active threads to completion, thereby obviating overhead associated with lock contention and vCPU migration after a context switch (i.e., to avoid rescheduling a thread on a different vCPU after execution of the thread was suspended).

41 Claims, 5 Drawing Sheets

(56) References Cited

U.S. PATENT DOCUMENTS

| | | |
|---|---|---|
| 9,069,708 B2 | 6/2015 | Gill et al. |
| 9,336,132 B1 | 5/2016 | Aron et al. |
| 9,652,265 B1 | 5/2017 | Narayanasamy et al. |
| 9,747,287 B1 | 8/2017 | Bhardwaj et al. |
| 9,772,866 B1 | 9/2017 | Aron et al. |
| 11,720,164 B1* | 8/2023 | Fredette ................ G06F 1/3287 713/324 |
| 2007/0088861 A1* | 4/2007 | Dudley ............... G06F 11/3485 714/E11.193 |
| 2017/0116039 A1* | 4/2017 | Mealey ............... G06F 9/45558 |
| 2018/0232142 A1* | 8/2018 | Shekar ................ G06F 11/2046 |
| 2019/0087124 A1* | 3/2019 | Mainetti ................. G06F 9/505 |
| 2020/0192725 A1* | 6/2020 | Feldkamp ............. G06F 9/5027 |
| 2022/0300349 A1* | 9/2022 | Shveidel .................. G06F 9/52 |

OTHER PUBLICATIONS

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible" from https://nutanixbible.com/ Sep. 2020 pp. all.

* cited by examiner

ELASTIC REQUEST HANDLING TECHNIQUE FOR OPTIMIZING WORKLOAD PERFORMANCE

CROSS-REFERENCE TO RELATED APPLICATIONS

The present application claims the benefit of India Provisional Patent Application Serial No. 202241025987, which was filed on May 4, 2022, by Daniel Chilton, et al. for ELASTIC REQUEST HANDLING TECHNIQUE FOR OPTIMIZING WORKLOAD PERFORMANCE, which is hereby incorporated by reference.

BACKGROUND

Technical Field

The present disclosure relates to processing of client workloads on a file system server and, more specifically, to optimizing processing of client workloads on a multi-threaded file system server.

Background Information

A file system server may include a protocol stack that serves logical constructs, such as files, to clients using industry standard data access protocols, such as network file system (NFS) and Common Internet File System (CIFS) protocols. The file system server may be implemented in accordance with a multi-process (i.e., multi-threaded) model usually automatically scaling with client workload. However, such automatic scaling (e.g., increasing) of server threads may not be optimal for certain client workloads, such as low-latency input/output (I/O) bound workloads, which may instead create contention and context switch overhead that decreases performance (e.g., reduce I/O data rate) as threads typically bound to single I/O operations needlessly switch among themselves or wait to be executed. Further, I/O operations may have varying latency requirements, so that greater resource utilization and efficiency may be achieved by processing I/O operations according to an expected latency without affecting throughput.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
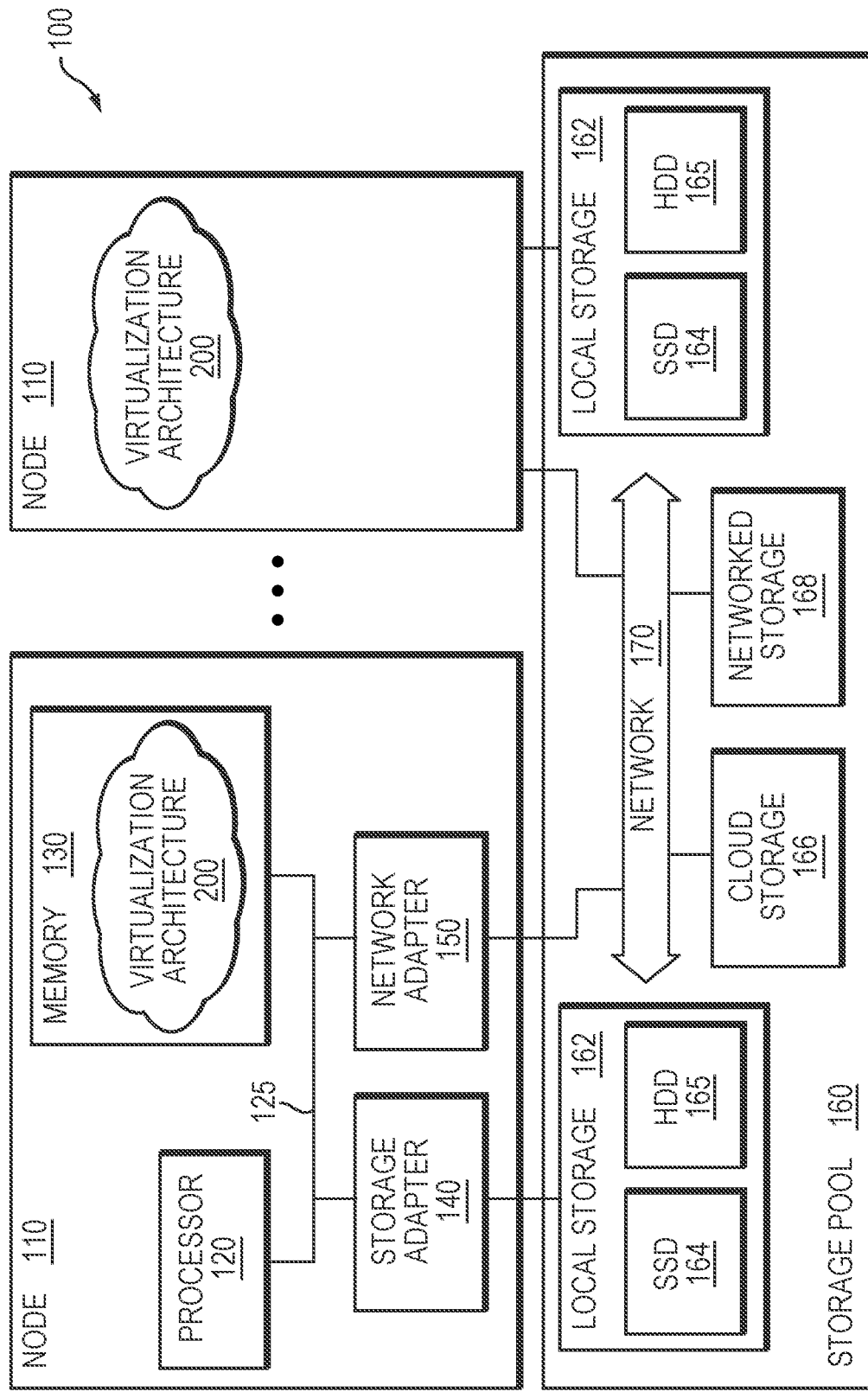
FIG. 1 is a block diagram of a plurality of nodes interconnected as a cluster in a virtualized environment.

The embodiments described herein are directed to an elastic request handling technique that limits a number of threads used to service input/output (I/O) requests of a low-latency I/O workload received by a file system server executing on a cluster having a plurality of nodes deployed in a virtualization environment. The limited number of threads (server threads) is constantly maintained as "active" and running on processor cores or virtual central processing units (vCPUs) of a node. The file system server (server) spawns and organizes the active server threads as one or more pools of threads. The server prioritizes the low-latency I/O requests by loading them onto the active threads and allowing the requests to run on those active threads to completion, thereby obviating overhead associated with lock contention and vCPU migration after a context switch (i.e., to avoid rescheduling a thread on a different vCPU after execution of the thread was suspended).

In an embodiment, the number of thread pools and the number of server threads in each pool may be determined (i) based on the hardware architecture of the nodes of the cluster and/or (ii) dynamically by measuring factors affecting the latency of the I/O workload, such as CPU time (e.g., context switches, queue delays, locking) and backend I/O time to storage (e.g., time to read/write from/to persistent media). Different types of I/O workloads (e.g., random reads, writes, metadata operations) usually have varying latency requirements, so that greater resource utilization and efficiency may be achieved by processing I/O workloads according to an expected latency without affecting throughput. For example, random read workloads may be granted greater I/O operations per second (IPOs) while keeping throughput for higher latency write workloads unaffected.

Illustratively, a maximum number of threads supported in a pool is based on memory and processing (vCPU) capacity configuration of the nodes. However, an actual number of threads deployed (used) to service the I/O requests is determined based on the measured factors affecting I/O workload latencies. For example, if the I/O latency is below a predetermined threshold, the number of active threads is maintained at a low number (e.g., a minimum) so that each vCPU has a dedicated thread running to accommodate processing of queued I/O requests to reduce needless context switching such as when a thread is dedicated to each I/O request. If the I/O latency increases (e.g., because backend storage resources are not responding fast enough causing the backend I/O time to increase), the number of active threads may be increased so as to process those queued requests. Thus, according to the technique, the backend I/O latency measure is used to determine whether to increase the number of threads in the pool rather than an I/O latency of the request as experienced by a user. In this manner, a degree of threading for processing I/O requests (i.e., a number of active threads processing I/O requests) is determined based on a backend I/O latency.

DESCRIPTION

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid-state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over a network, which is illustratively an Ethernet local area network (LAN) 170. The network adapter 150 may thus be embodied as a network interface card having the mechanical, electrical and signaling circuitry needed to connect the node 110 to the LAN. In an embodiment, one or more intermediate stations (e.g., a network switch, router, or virtual private network gateway) may interconnect the LAN with network segments organized as a wide area network (WAN) to enable communication between the nodes of cluster 100 and remote nodes of a remote cluster over the LAN and WAN (hereinafter "network") as described further herein. The multiple tiers of SOCS include storage that is accessible through the network, such as cloud storage 166 and/or networked storage 168, as well as the local storage 162 within or directly attached to the node 110 and managed as part of the storage pool 160 of storage items, such as files and/or logical units (LUNs). The cloud and/or networked storage may be embodied as network attached storage (NAS) or storage area network (SAN) and include combinations of storage devices (e.g., SSDs and/or HDDs) from the storage pool 160. Communication over the network may be affected by exchanging discrete frames or packets of data according to protocols, such as the Transmission Control Protocol/Internet Protocol (TCP/IP) and User Datagram Protocol (UDP), as well as protocols for authentication, such as the OpenID Connect (OIDC) protocol, while other protocols for secure transmission, such as the HyperText Transfer Protocol Secure (HTTPS) may also be advantageously employed.

The main memory 130 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
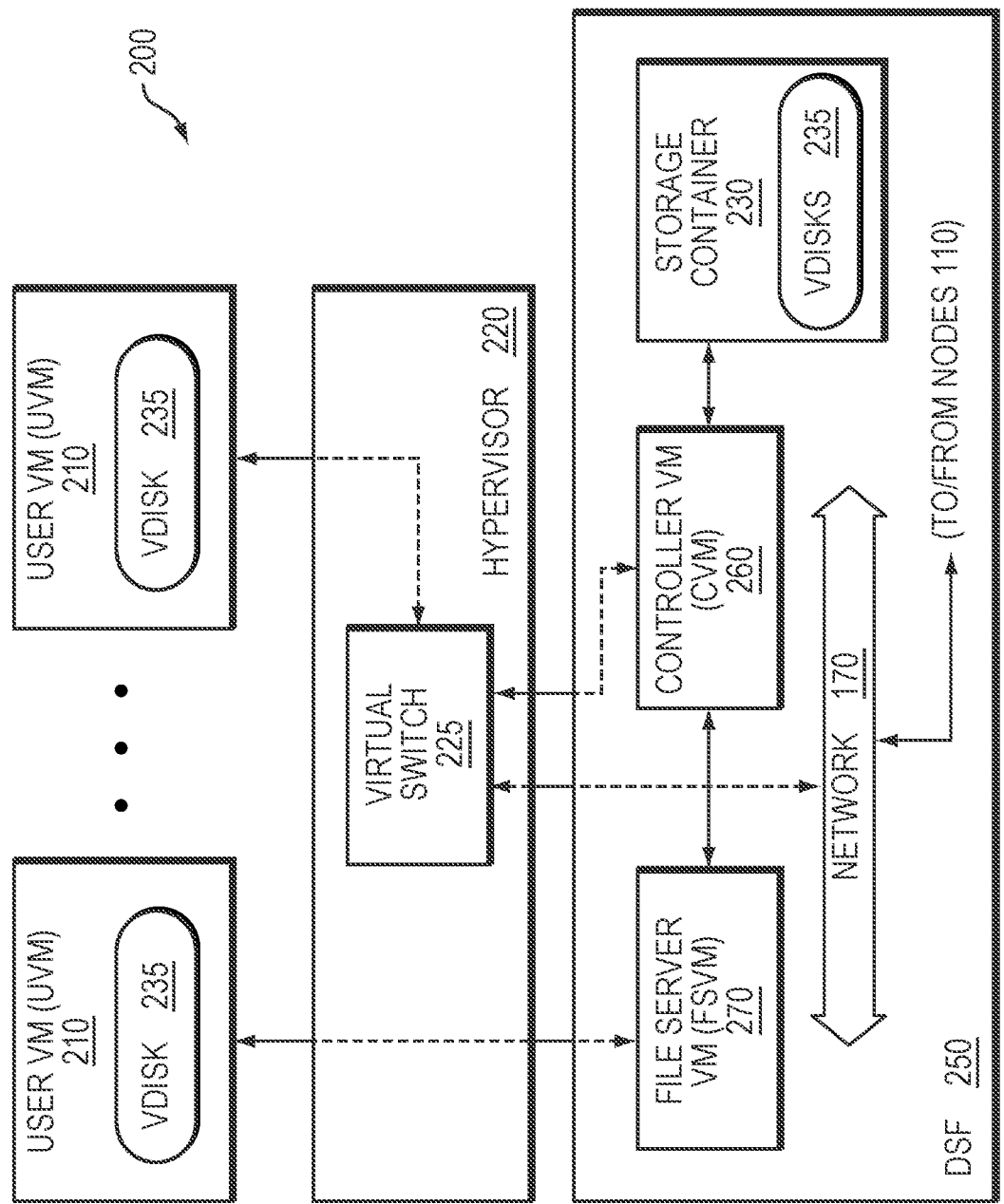
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 260, which functions as a virtual controller for SOCS. The CVMs 260 on the nodes 110 of the cluster 100 interact and cooperate to form a distributed data processing system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyper-convergence architecture wherein the nodes provide both storage and computational resources available cluster wide.

A file server virtual machine (FSVM) 270 is a software component that provides file services to the UVMs 210 including storing, retrieving and processing I/O data access operations requested by the UVMs 210 and directed to data stored on the DSF 250. The stored data may be represented as a set of storage items, such as files organized in a hierarchical structure of folders (also known as directories), which can contain files and other folders, as well as shares, which can also contain files and folders. Illustratively, the FSVM 270 may communicate with storage resources provided by CVM 260 to store and retrieve files, folders, SMB shares, or other storage items stored on storage pool 160. The FSVM 270 may also store and retrieve block-level data, including block-level representations of the storage items, on the storage pool 160.

The client software (e.g., applications) running in the UVMs 210 may access the DSF 250 using filesystem protocols, such as the network file system (NFS) protocol, the server message block (SMB) protocol, the common internet file system (CIFS) protocol, and the internet small computer system interface (iSCSI) protocol. Operations on these filesystem protocols are interposed at the hypervisor 220 and forwarded to the FSVM 270, which cooperates with the CVM 260 to perform the operations on data stored on local storage 162 of the storage pool 160. The CVM 260 may export one or more iSCSI, CIFS, or NFS targets organized from the storage items in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI, SMB, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 260 on the same or different node 110. The UVM 210 may issue the I/O accesses as a SCSI protocol request to the storage device. Illustratively, the hypervisor 220 intercepts the SCSI request and converts it to an iSCSI, CIFS, or NFS request as part of its hardware emulation layer. As previously noted, a virtual SCSI disk attached to the UVM 210 may be embodied as either an iSCSI LUN or a file served by an NFS or CIFS server. An iSCSI initiator, SMB/CIFS or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 260 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 260 within the same node as the UVM 210, then the IP-based storage protocol request is internally forwarded within the node to the CVM. The CVM 260 is configured and structured to properly interpret and process that request. Notably the IP-based storage protocol request packets may remain in the node 110 when the communication—the request and the response—begins and ends within the hypervisor 220. In other embodiments, the IP-based storage protocol request may be routed by the virtual switch 225 to a CVM 260 on another node of the same or different cluster for processing. Specifically, the IP-based storage protocol request may be forwarded by the virtual switch 225 to an intermediate station (not shown) for transmission over the network (e.g., WAN) to the other node. The virtual switch 225 within the hypervisor 220 on the other node then forwards the request to the CVM 260 on that node for further processing.

Operationally, a UVM 210 may send an I/O request (e.g., a read or write operation) to the FSVM 270 via the hypervisor 220, and the FSVM 270 may perform the operation specified by the request. The FSVM 270 may present a virtualized file system to the UVM 210 as a namespace of mappable shared drives or mountable network filesystems of files and directories. The namespace of the virtualized filesystem may be implemented using storage devices of the storage pool 160, onto which the shared drives or network filesystems, files, and folders, or portions thereof, may be distributed as determined by the FSVM 270. The FSVM 270 may present the storage capacity of the storage devices as an efficient, highly available, and scalable namespace in which the UVMs 210 may create and access shares, files, and/or folders. As an example, a network share may be presented to a UVM 210 as one or more discrete vdisks 235, but each vdisk may correspond to any part of one or more virtual or physical disks (storage devices) within storage pool 160. The FSVM 270 may access the storage pool 160 via the CVM 260. The CVM 260 may cooperate with the FSVM 270 to perform I/O request to the storage pool 160 using local storage 162 within the same node 110, by connecting via the network 170 to cloud storage 166 or networked storage 168, or by connecting via the network 170 to local storage 162 within another node 110 of the cluster (e.g., by connecting to another CVM 260).

As noted, a file system server (such as, e.g., FSVM 270) may be implemented in accordance with a multi-threaded model, wherein threads employed by the FSVM (e.g., server threads) automatically scale with client workload. Automatic scaling (e.g., increasing) of server threads may not be optimal for certain client workloads, such as extensive low-latency I/O bound workloads, but may instead decrease performance (e.g., reduce I/O data rate). For example, assume the FSVM 270 spawns a plurality of threads to run on a multi-core processor, e.g., central processing unit (CPU), in order to service I/O requests of a client workload. Scheduling delays may occur because each server thread may need to wait (e.g., in a queue) to be scheduled (e.g., on conditional wait) for a next I/O request to run on a CPU core before actually running on the core, thereby increasing the time for the request to complete.

The embodiments described herein are directed to an elastic request handling technique that limits a number of threads used to service I/O requests of a low-latency I/O workload received by a file system server executing on a cluster having a plurality of nodes deployed in a virtualization environment. The limited number of threads (server threads) is constantly maintained as "active" and running on a CPU core, e.g., a virtual CPU (vCPU) of the cluster. The file system server (e.g., FSVM) prioritizes the low-latency I/O requests by loading them onto the active server threads and allowing the requests to run on those active threads to completion, thereby obviating overhead associated with lock contention and vCPU migration after a context switch (i.e., to avoid rescheduling a thread on a different vCPU after execution of the thread was suspended).

Figure 3:
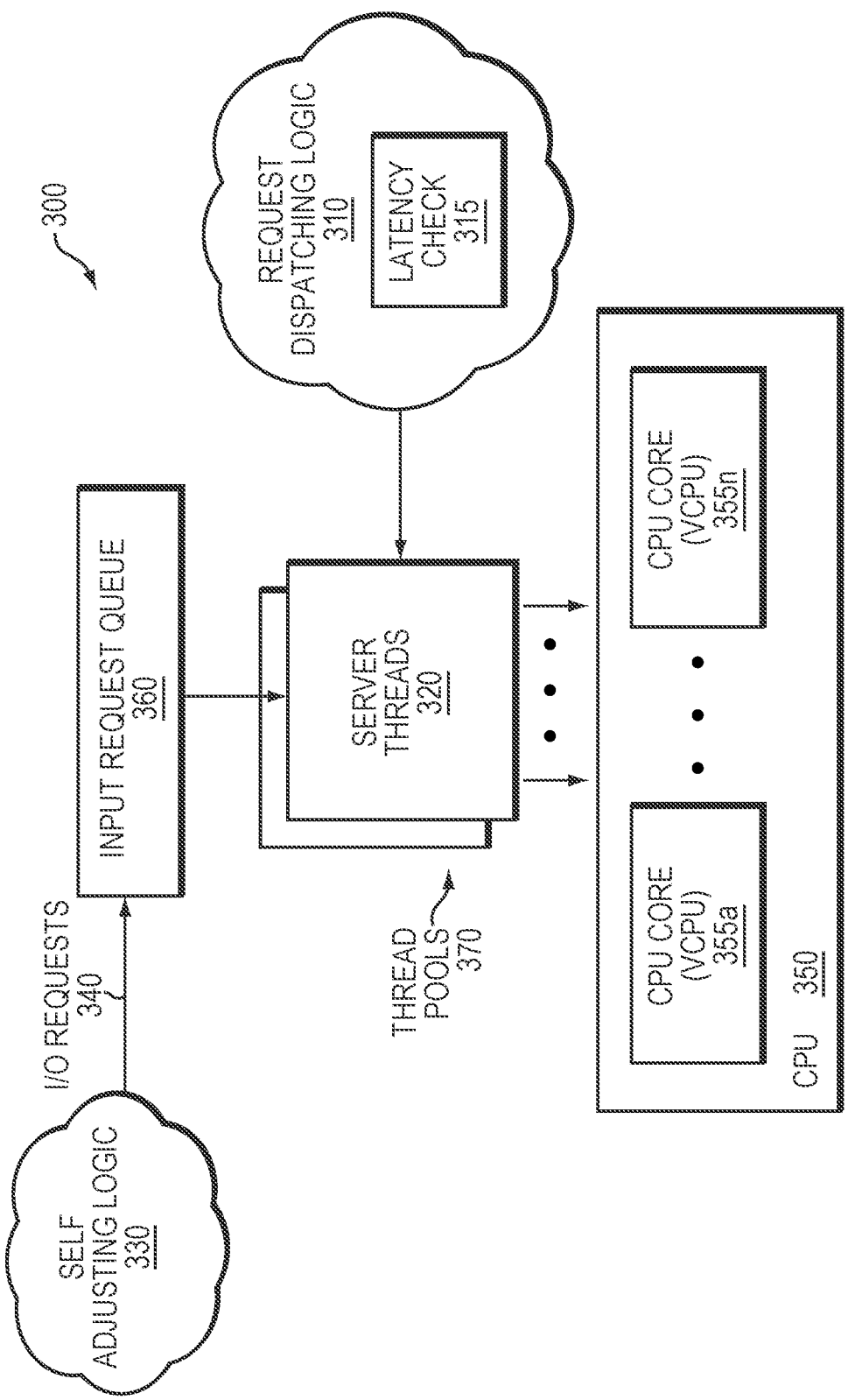
FIG. 3 is a block diagram of an architecture of an elastic request handling technique.

FIG. 3 is a block diagram of an architecture 300 of the elastic request handling technique. Request dispatching logic 310 of the FSVM 270 determines the number of server threads 320 according to previously measured I/O latency of the workload as well as context switch overhead associated with a multi-core (e.g., 8 cores) CPU 350, wherein each CPU core is illustratively a virtual CPU (vCPU) 355. In addition, self-adjusting logic 330 of the FSVM 270 is configured to limit the number of I/O requests 340 associated with (loaded on) the server threads 320 to run on the vCPUs 355 and perform I/O operations to underlying storage resources of the cluster 100 such that the I/O latency remains low while maintaining maximum throughput. The FSVM 270 spawns and organizes the active server threads 320 (e.g., 200 server threads) as one or more pools 370 of threads. As the I/O requests 340 are received, the FSVM 270 stores the requests in an input request queue 360. Subsequently, each I/O request 340 is removed from the queue 360 and loaded onto an active server thread 320 that is running on a vCPU 355. As I/O activity associated with the workload increases, additional threads 320 may be spawned up to a maximum number of threads in the pool.

In an embodiment, the number of thread pools 370 and the number of server threads 320 in each pool may be determined (i) based on the hardware architecture of the nodes 110 of the cluster 100 and/or (ii) dynamically by measuring factors affecting latency of the I/O workload, such as processor time (e.g., context switches, queue delays, locking) and backend I/O time to storage (e.g., time to read/write from/to persistent media). Different types of I/O workloads (e.g., random reads, writes, metadata operations) usually have varying latency requirements, so that greater resource utilization and efficiency may be had by processing I/O workloads according to an expected latency without affecting throughput. For example, random read workloads may be granted greater I/O operations per second (IPOs) while keeping throughput for higher latency write workloads unaffected.

For example, a maximum number of threads supported in a pool is illustratively based on memory and processing (vCPU) capacity configuration of the nodes. However, an actual number of threads used (deployed) to service the I/O requests is determined based on the measured factors affecting I/O workload latencies. To that end, the request dispatching logic 310 may be configured to perform a latency check 315 that, e.g., computes a time-based moving average of latencies and determines a point-in-time latency in order to limit the number of server threads 320 of the thread pool 370 sufficient to meet a predetermined latency threshold. If the I/O latency is below (e.g., does not exceed) the predetermined threshold, the number of active threads is maintained at a minimum so that each vCPU 355 has a dedicated thread running to accommodate de-queuing and processing of I/O requests 340 thereby reducing needless context switching such as when a thread is dedicated to each I/O request. If the I/O latency increases (e.g., exceeds the threshold because the backend storage resources, such as controllers/servers and/or storage devices, are not responding fast enough causing the backend I/O time to increase), the input request queue 360 may become full and the number of active threads may be increased so as to process those queued requests. Thus, according to the technique, the backend I/O latency measure is used to determine whether to increase the number of threads (thread count) in the pool, rather than an I/O latency of the request as experienced by a user. In this manner, a degree of threading for processing I/O requests (i.e., a number of active threads processing I/O requests) is determined based on a backend I/O latency. Notably, the technique strives to keep the thread count as low as possible until the backend latency increases, at which time the thread count may increase. Such "backend latency-driven" optimization is in contrast to traditional file system servers which determine thread count based on the number of input I/O requests, i.e., frontend latency-driven optimization.

Figure 4:
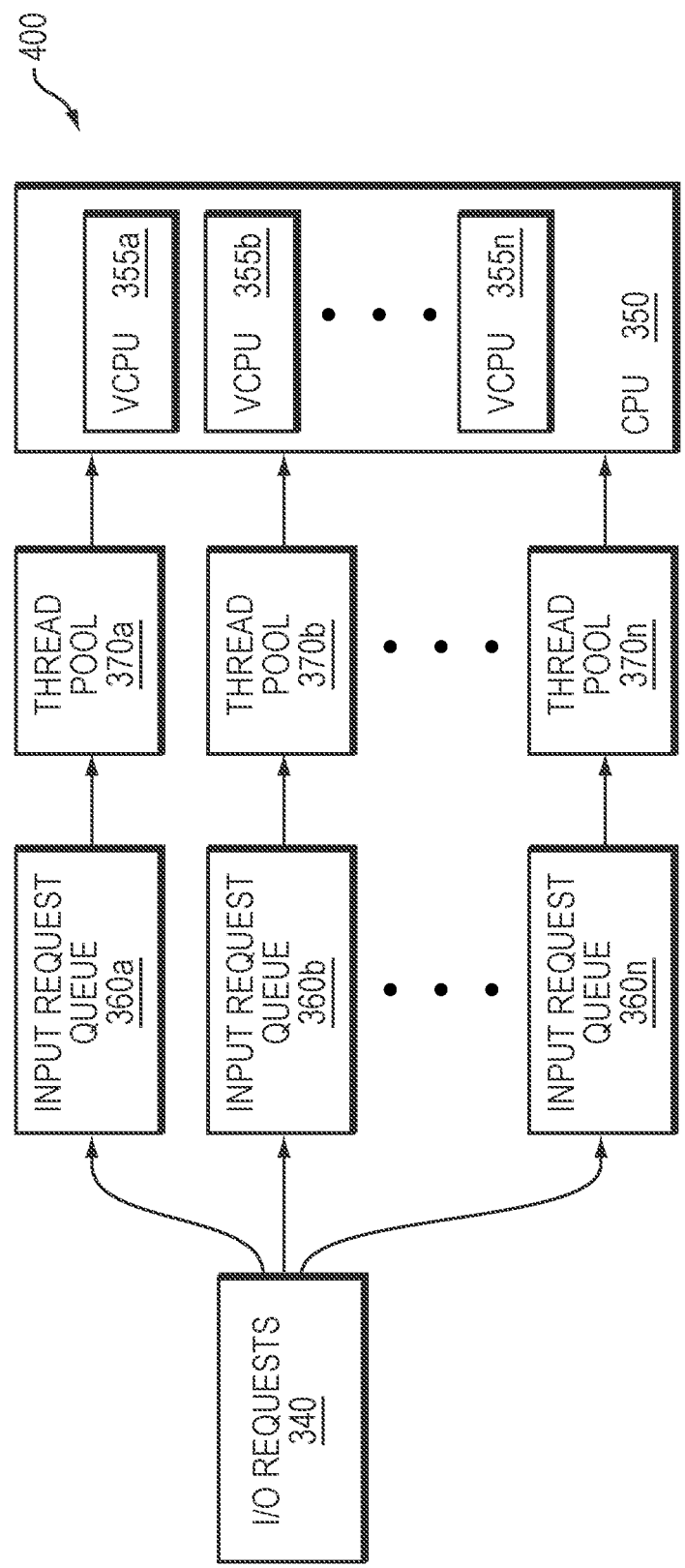
FIG. 4 is a block diagram of a multiple thread pool configuration of the elastic request handling technique.
Figure 5:
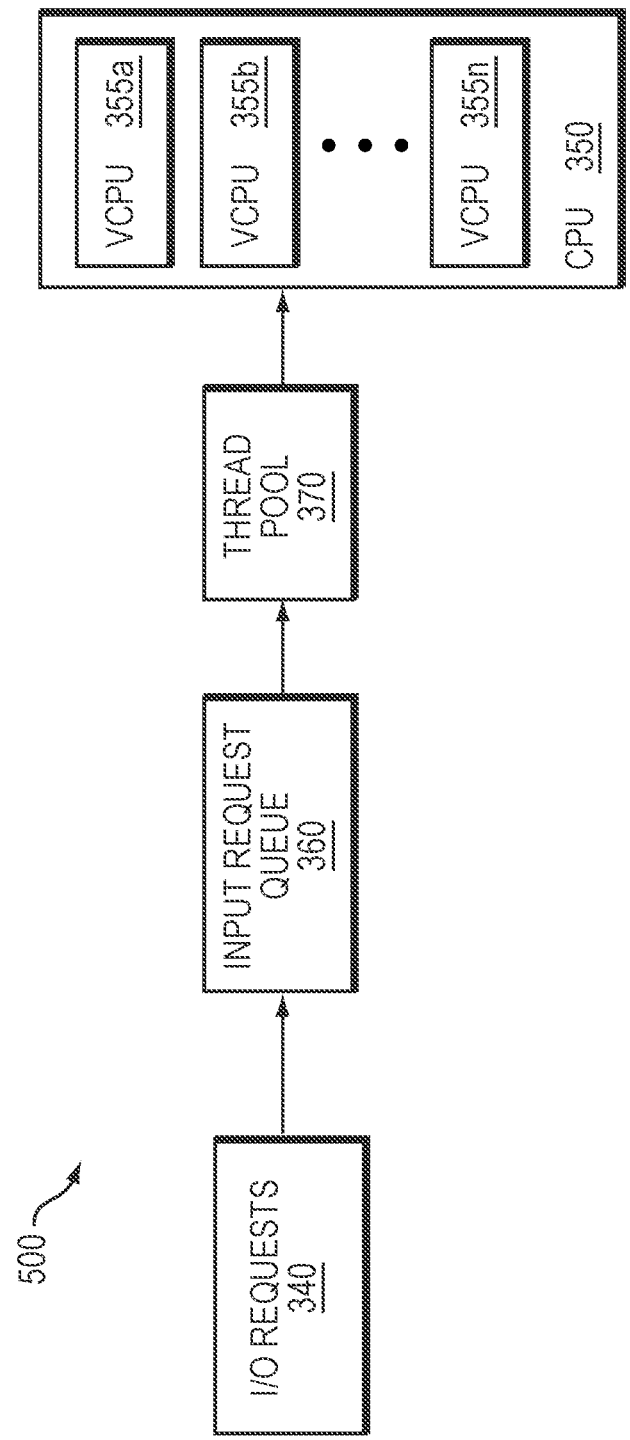
FIG. 5 is a block diagram of a single thread pool configuration of the elastic request handling technique.

FIG. 4 is a block diagram of a multiple thread pool configuration 400 of the elastic request handling technique. The use of multiple thread pools 370a-n allows apportioning of the server threads 320 such that each pool has fewer threads and fewer lock contentions (e.g., fewer contentions among server threads 320 to acquire locks to a resource, such as a thread pool 370), which reduces overhead. As noted, the number of thread pools may be based on the hardware architecture of the cluster nodes (e.g., the number of vCPUs 355), wherein the greater the number of vCPUs 355, the greater the number of thread pools 370n, primarily to handle network load. In the illustrative embodiment described herein, however, the number of thread pools is preferably one. FIG. 5 is a block diagram of a single thread pool configuration 500 of the elastic request handling technique. That is, the elastic request handling technique is illustratively directed to optimizing the number of active server threads 320 for servicing I/O requests 340 loaded into the input request queue 360 using a single thread pool 370.

In an embodiment, the elastic requests handling technique considers I/O workload type/class and size as well as measured backend I/O latency, i.e., once an I/O completes, to trigger adjustment of the thread count of the thread pool 370. For instance, if the measured backend I/O latency is high, the FSVM 270 may spawn additional threads, whereas if the backend I/O latency is low, a fewer thread count is maintained. The type/class of workload involving, e.g., read, write or metadata operations, may determine the expected latency and, thus, a threading model for the number of threads needed (e.g., read workload latencies are generally lower than write workload latencies). For example, long duration write operations require a threading model (e.g., more threads which may be suspended waiting on I/O completions) that may be different than the threading model (e.g., a low latency threading mode) for short duration reads that minimizes contention of vCPU and context switches.

Notably, the technique is directed to small I/O requests (e.g., transfer less than 16 kB of data per request) that desire rapid completions so as to optimize processing of a large number (e.g., 1M) of I/O requests, such as for random read operations, because many applications benefit from improved random read I/O operations (e.g., 1 k or 4 k read is operations for databases). Accordingly, the threading model may be adjusted for a low latency I/O bound workload wherein a limited (e.g., minimum) number of server threads is always maintained as "active." I/O requests 340 are de-queued from the input request queue 360 and loaded onto those active threads 320 for processing by the vCPUs 355 to obviate CPU migration after a context switch (e.g., to avoid rescheduling the thread on a different vCPU.)

The foregoing description has been directed to specific embodiments. It will be apparent however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

receiving input/output (I/O) requests of a workload at a file server of a node coupled to persistent storage media, wherein different types of I/O requests have corresponding latency bounds;

processing the I/O requests of the workload according to an expected I/O latency using a pool of threads executing on one or more processors of the node;

maintaining a number of the threads as active threads of the pool to run on the processors;

measuring an I/O latency for storing data of the I/O requests on the persistent storage media; and in response to the measured I/O latency for storing the data exceeding a predetermined threshold, increasing the number of active threads from the pool deployed to increase processing of the I/O requests to run to completion on the active threads based on the corresponding expected I/O latency bounds for the I/O request type.

2. The method of claim 1 wherein a minimum number of threads is maintained as deployed for low latency workloads identified from the I/O requests.

3. The method of claim 1 wherein the processors are virtual central processing units (vCPUs) and wherein a minimum number of threads is maintained as the active threads to run on the vCPUs.

4. The method of claim 1, wherein the workload I/O request types are selected from one or more of (i) read accesses, (ii) write accesses, (iii) random read accesses, or (iv) metadata accesses.

5. The method of claim 3 further comprising, in response to the measured I/O latency not exceeding the predetermined threshold, maintaining the minimum number of the active threads so that each vCPU has a dedicated thread running to accommodate processing of the I/O requests.

6. The method of claim 1 wherein a maximum number of threads supported in the pool is based on memory and processing capacity configuration of the node.

7. The method of claim 1 wherein the number of threads in the pool is based on a hardware architecture of the node.

8. The method of claim 1 wherein the number of threads in the pool is determined dynamically by measuring factors affecting the I/O latency of the workload.

9. The method of claim 8 wherein the factors include processor time such as context switches and queue delays.

10. The method of claim 8 wherein the factors include backend I/O time to storage such as time to read or write to the persistent storage media.

11. A method comprising:
receiving input/output (I/O) requests of a workload at a file server of a node coupled to persistent storage media, wherein different type of I/O requests have corresponding latency bounds;
processing the I/O requests of the workload according to an expected I/O latency using a pool of threads executing on one or more processors of the node;
maintaining a number of the threads as active threads of the pool to run on the processors;
measuring an I/O latency for storing data of the I/O requests on the persistent storage media; and
adjusting a number of the threads from the pool deployed to process the I/O requests according to the measured I/O latency such that the I/O latency is maintained within the corresponding expected I/O latency bounds for the I/O request types.

12. The method of claim 11 further comprising:
in response to the measured I/O latency exceeding the predetermined threshold of the corresponding expected I/O latency bounds, increasing the adjusted number of threads.

13. The method of claim 11 wherein a minimum number of threads is maintained as deployed for low latency workloads identified from the I/O requests.

14. The method of claim 11 wherein the processors are virtual central processing units (vCPUs) and wherein a minimum number of threads is maintained as the active threads to run on the vCPUs.

15. The method of claim 14 further comprising prioritizing low latency I/O requests to run to completion on the active threads.

16. The method of claim 11 wherein a maximum number of threads supported in the pool is based on memory and processing capacity configuration of the node.

17. The method of claim 11 wherein the workload I/O request types are selected from one or more of (i) read accesses, (ii) write accesses, (iii) random read accesses, or (iv) metadata accesses.

18. The method of claim 11 wherein the number of threads in the pool is determined dynamically by measuring factors affecting the I/O latency of the workload.

19. The method of claim 18 wherein the factors include processor time and backend I/O time to storage.

20. A non-transitory computer readable medium including program instructions for execution on one or more processors of a node of a storage system, the program instructions configured to:
receive input/output (I/O) requests of a workload at a file server of the node coupled to persistent storage media, wherein different types of I/O requests have corresponding latency bounds;
process the I/O requests of the workload according to an expected I/O latency using a pool of threads executing on the one or more processors of the node;
maintain a number of the threads as active threads of the pool to run on the processors;
measure an I/O latency for storing data of the I/O requests on the persistent storage media; and
adjust a number of the threads from the pool deployed to process the I/O requests according to the measured I/O latency, such that the I/O latency is maintained within the corresponding expected I/O latency bounds for the I/O request types.

21. The non-transitory computer readable medium of claim 20 wherein the program instructions for execution on the one or more processors are further configured to:
in response to the measured I/O latency exceeding the predetermined threshold of the corresponding expected I/O latency bounds, increase the adjusted number of threads.

22. The non-transitory computer readable medium of claim 20 wherein a minimum number of threads is maintained as deployed for low latency workloads identified from the I/O requests.

23. The non-transitory computer readable medium of claim 21 wherein the processors are virtual central processing units (vCPUs) and wherein a minimum number of threads is maintained as active threads to run on the vCPUs.

24. The non-transitory computer readable medium of claim 23 wherein the program instructions for execution on the one or more processors are further configured to prioritize low latency I/O requests to run to completion on the active threads.

25. The non-transitory computer readable medium of claim 23 wherein the program instructions for execution on the one or more processors are further configured to, in response to the measured I/O latency not exceeding the predetermined threshold, maintain the minimum number of the active threads so that each vCPU has a dedicated thread running to accommodate processing of the I/O requests.

26. The non-transitory computer readable medium of claim 20 wherein a maximum number of threads supported in the pool is based on memory and processing capacity configuration of the node.

27. The non-transitory computer readable medium of claim 20 wherein the workload I/O request types are selected from one or more of (i) read accesses, (ii) write accesses, (iii) on a read accesses, or (iv) metadata accesses.

28. The non-transitory computer readable medium of claim 20 wherein the number of threads in the pool is determined dynamically by measuring factors affecting the I/O latency of the workload.

29. The non-transitory computer readable medium of claim 28 wherein the factors include I/O time to read or write to the persistent storage media.

30. The non-transitory computer readable medium of claim 28 wherein the factors include processor execution time of context switches and queue delays.

31. A system comprising:
a storage system having a node with one or more processors coupled to persistent storage media, the one or more processors configured to execute program instructions to:
receive input/output (I/O) requests of a workload at a file server of the node, wherein different types of I/O requests have corresponding latency bounds;
process the I/O requests of the work load according to an expected I/O latency using a pool of threads executing on the one or more processors;
maintain a number of the threads as active threads of the pool to run on the processors;
measure an I/O latency for storing data of the I/O requests on the persistent storage media; and
adjust a number of the threads from the pool deployed to process the I/O requests according to the measured I/O latency such that the I/O latency is maintained within the corresponding expected I/O latency bounds for the I/O request types.

32. The system of claim 31, wherein the processors of the node configured to execute program instructions are further configured to execute program instructions to:
in response to the measured I/O latency exceeding the predetermined threshold of the corresponding expected I/O latency bounds, increase the adjusted number of threads.

33. The system of claim 31, wherein a minimum number of threads is maintained as deployed for low latency workloads identified from the I/O requests.

34. The system of claim 32, wherein the processors of the node are configured as virtual central processing units (vCPUs) and wherein the vCPUs are configured to execute program instructions to maintain a minimum number of threads as active threads to run on the vCPUs.

35. The system of claim 34, wherein the vCPUs are further configured to execute program instructions to prioritize low latency I/O requests to run to completion on the active threads.

36. The system of claim 34, wherein the vCPUs are further configured to execute program instructions to, in response to the measured I/O latency not exceeding the predetermined threshold, maintain the minimum number of the active threads so that each vCPU has a dedicated thread running to accommodate processing of the I/O requests.

37. The system of claim 31, wherein a maximum number of threads supported in the pool is based on memory and processing capacity configuration of the node.

38. The system of claim 31, wherein the workload I/O request types are selected from one or more of (i) read accesses, (ii) write accesses, (iii) random read accesses, or (iv) metadata accesses.

39. The system of claim 31, wherein the number of threads in the pool is determined dynamically by measuring factors affecting the I/O latency of a workload.

40. The system of claim 39, wherein the factors include backend I/O time to read or write to the persistent storage media.

41. The system of claim 39, wherein the factors include processor execution time of context switches and queue delays.

* * * * *

UNITED STATES PATENT AND TRADEMARK OFFICE
CERTIFICATE OF CORRECTION

PATENT NO. : 12,204,755 B2  
APPLICATION NO. : 17/853123  
DATED : January 21, 2025  
INVENTOR(S) : Daniel Chilton et al.

Page 1 of 2

It is certified that error appears in the above-identified patent and that said Letters Patent is hereby corrected as shown below:

In the Specification

Column 8, Line 22 reads:  
"(e.g., transfer less than 16 kB of data per request) that desire"  
Should read:  
--(e.g., transfer less than 16kB of data per request) that desire--

Column 8, Lines 26-27 reads:  
"improved random read I/O operations (e.g., 1 k or 4 k read is operations for databases). Accordingly, the threading"  
Should read:  
--improved random read I/O operations (e.g., 1k or 4k read operations for databases). Accordingly, the threading--

In the Claims

Column 9, Line 4:  
Claim 1 reads:  
"request type."  
Should read:  
--request types.--

Column 9, Line 39:  
Claim 11 reads:  
"media, wherein different type of I/O requests have"  
Should read:  
--media, wherein different types of I/O requests have--

Signed and Sealed this  
Eighth Day of April, 2025

Coke Morgan Stewart  
*Acting Director of the United States Patent and Trademark Office*

Column 9, Line 54:
Claim 12 reads:
"in response to the measured I/O latency exceeding the"
Should read:
--in response to the measured I/O latency exceeding a--

Column 10, Line 36:
Claim 21 reads:
"in response to the measured I/O latency exceeding the"
Should read:
--in response to the measured I/O latency exceeding a--

Column 10, Line 67:
Claim 27 reads:
"accesses, (iii) random a read accesses, or (iv) metadata accesses."
Should read:
--accesses, (iii) random read accesses, or (iv) metadata accesses.--

Column 11, Line 18:
Claim 31 reads:
"process the I/O requests of the work load according to an"
Should read:
--process the I/O requests of the workload according to an--

Column 11, Line 33:
Claim 32 reads:
"in response to the measured I/O latency exceeding the"
Should read:
--in response to the measured I/O latency exceeding a--